United States Patent [19]

Bernitsyn et al.

[11] Patent Number: 5,029,548
[45] Date of Patent: Jul. 9, 1991

[54] HIGH-SPEED CRAFT

[76] Inventors: Andrei A. Bernitsyn, ulitsa Sikeirosa, 21/6, korpus 1, kv. 48; Mikhail D. Dmitrochenko, Sestroretskaya ulitsa, 7, kv. 81; Artur E. Kipin, Uchitelskaya ulitsa 19, korpus 2, kv. 170; Evgeny A. Kramarev, Vitebsky prospekt, 67, kv. 137, all of Leningrad, U.S.S.R.

[21] Appl. No.: 458,673
[22] PCT Filed: Apr. 20, 1989
[86] PCT No.: PCT/SU89/00105
  § 371 Date: Jan. 23, 1990
  § 102(e) Date: Jan. 23, 1990
[87] PCT Pub. No.: WO89/11414
  PCT Pub. Date: Nov. 30, 1989

[30] Foreign Application Priority Data

May 23, 1988 [SU] U.S.S.R. .............................. 4450873

[51] Int. Cl.$^5$ .............................................. B63B 1/16
[52] U.S. Cl. .................................................. 114/272
[58] Field of Search ........................ 114/271–273, 114/283, 292; 244/12.1, 105, 89–93

[56] References Cited

U.S. PATENT DOCUMENTS

| | | | |
|---|---|---|---|
| 3,190,582 | 6/1965 | Lippisch | 244/12.1 |
| 3,288,096 | 11/1966 | Swenson | 114/273 |
| 3,918,382 | 11/1975 | Austin | 114/273 |
| 4,705,234 | 11/1987 | Bourn | 244/105 |

Primary Examiner—Jesus D. Sotelo
Attorney, Agent, or Firm—Burgess, Ryan & Wayne

[57] ABSTRACT

A high-speed craft comprises a hull (1), lifting wings (2) with sponsons (3), and a tail fin assembly including a vertical keel (5) and a stabilizer (6) having an inverted-V configuration and rotatably mounted about a vertical axis (7), driven by a steering gear (13,15). In turning the craft, the forces acting on half-wings of the stabilizer (6) generate a moment making the craft heel to the inner side of the bend, whereby the transverse component of the aerodynamic lift opposes to the lateral drift caused by centrifugal forces acting on the craft.

22 Claims, 6 Drawing Sheets

HIGH-SPEED CRAFT

FIELD OF THE INVENTION

The invention relates to ship building and more specifically, to high-speed craft.

BACKGROUND OF THE INVENTION

At high speed, the hull of a vehicle such as the high-speed craft is known to be acted upon by significant aerodynamic forces. In a number of cases, provided aerodynamic surfaces are incorporated in the hull of the high-speed craft, these forces tend to balance out, partially or fully, the weight of the hull. This pattern of motion allows a noticeable decrease in the specific power of the craft due to its reduced drag.

These effects that are enhanced by the influence of the water surface ("ground") occur at sufficiently high velocities: generally above 10 to 12 $Fr_y$ (which corresponds to 110–120 km/h for a craft of 1000 kg displacement). At such speeds, it involves certain difficulties to provide both longitudinal and lateral stability of the craft, especially when manoeuvring. It is due to the fact, that if sudden perturbations occur such as waves, gusts of wind, the craft may lose contact with water, take off from the surface, and capsize. When manoeuvring at such speeds, the craft is acted upon by significant centrifugal forces which may disturb the lateral stability of the craft and result in capsizing, or else, if the area of the steering surfaces is not sufficient, the craft becomes essentially uncontrollable. These circumstances require a developed tail fin assembly, the optimum configuration of the tail fins for such high-speed craft being either T- or V-shape (N. I. Belayin, "Ekranoplany", 1977, Sudostroenie/Leningrad/, pp. 187–195).

One known high-speed vessel is a ground-effect craft comprising a hull with a T-shaped tail fin assembly, lifting wings with sponsons, an engine with a propulsion unit, and a steering gear (N. I. Belayin, "Ekranoplany", 1977, Sudoestroenie (Leningrad), pp. 96–99; DE, A, 1234539, U.S. Pat. No. 3,190,582). The tail fin assembly of such craft includes a vertical fin with a portion thereof being made rotatable about the vertical axis and connected to the steering gear, and a stabilizer with a pair of straight (zero-V) half-wings, the stabilizer being secured to the stationary portion of the fin.

One disadvantage of this craft is its poor maneuverability when moving over the water surface. It manifests itself in the fact that in order to make a turn of a specified (small) radius, the craft has either to change the travel conditions and to increase the clearance or to substantially reduce the speed and contact the water surface. With increased clearance height, which is in itself an uneconomical and hard-to-control procedure, a heel has to be provided which is inward relative to the turn, this heeling being achieved by means of an additional control system and additional controls, i.e. ailerons (winglets). The additional controls involve great difficulties in steering the craft and, what is more, making the control inefficient when the craft moves at a low height. As a result, even though additional control members are provided, the steering of the craft, when it moves at a low clearance height above the water surface ("ground") is made difficult, because we fail to provide an effective counteraction against the centrifugal forces developed when maneuvering the craft.

DISCLOSURE OF THE INVENTION

The principal object of the present invention is to provide a high-speed craft with a tail fin assembly designed such that it improves maneuverability of the craft as it moves at a high speed, without the necessity to add extra control members.

With this principal object in view, there is provided a high speed craft comprising a hull, lifting wings with sponsons, an engine, a steering gear, and a tail fin assembly including a vertical keel and a stabilizer with a pair of half-wings, wherein, according to the invention, the stabilizer is mounted rotatably about the vertical axis, has an inverted-V configuration, and is connected with the steering gear.

Owing to this realization of the stabilizer, as the craft is turned, a heeling force directed towards the turn is generated on the inner half-wing (relative to the turn), while the lift on the outer half-wing is increased. As a result, a heeling moment acts on the tail fin assembly, and hence on the entire craft, which provides the required inward heel, whereby a lateral component of the aerodynamic lift exerted on the craft is opposed to the lateral drift generated by centrifugal forces, thus improving the maneuverability of the craft, allowing its turn on a specified radius at a small height above the water surface, when moving at normal speed.

It is advisable that the stabilizer be of the swept type.

This allows a sternward shift of the lift resultant and an increased length of the stabilizer arm, thus substantially improving the craft stability in motion.

If the vertical keel is rotatably mounted about the vertical axis and connected with the steering gear, it is preferred that the stabilizer be rigidly attached to the vertical keel.

Also the vertical keel may have a cavity inside its bottom portion to receive the above-water part of the outboard engine.

If it is only one section of the vertical keel that is rotatable about the vertical axis and connected with the steering gear, the stabilizer is preferably attached to this rotary section of the vertical keel.

It is also advisable that the rotary section of the vertical keel have a cavity in its bottom part to receive the outboard engine.

The arrangement of the outboard engine inside the vertical keel (or its rotary section) causes the aerodynamic drag of the engine to be substantially reduced, simultaneously improving the operating conditions of the stabilizer and protecting the engine from spray.

The craft with an outboard engine also may have the rotary section of the vertical keel located above the engine.

In this case, a reduced aerodynamic drag is likewise achieved, also providing a convenient maintenance of the engine.

According to one embodiment of the invention, the vertical keel includes two elements arranged in symmetry about the center line of the craft.

This results in a more efficient operation of the keel and consequently improves manoeuvrability of the craft due to removal of the keel elements out of the wake zone which is characterized by reduced velocities.

Here the elements of the vertical keel are preferably positioned at an angle to the center line of the craft.

This enables the heeling moment developed in turning to be optimized.

In an outboard-engine craft, the elements of the vertical keel may be secured to the sides of the engine.

Such arrangement of the keel elements makes the engine readily accessible and eases its maintenence.

To increase aerodynamic efficiency of the tail fin assembly and to reduce its weight/size characteristics, the stabilizer may be mounted on the hull and the element of the vertical keel may be attached to the half-wings of the stabilizer.

In case the craft has an outboard engine provided with an aerodynamic fairing, it is advisable that the stabilizer be mounted on the fairing and the elements of the vertical keel be secured to the half-wings of the stabilizer.

This aids in a minimized aerodynamic drag of the craft, especially with the helmsman in a lying or reclining position.

To provide an easier access to the outboard engine, the stabilizer section in the vicinity of the center line of the craft may be fabricated of a transparent material.

Both the outboard and the inboard engine may be made still more accessible by means of a longitudinal slot provided in the stabilizer and extending at the interface of the elements of the vertical keel.

According to one of the embodiments of the invention, the stabilizer includes an additional member interposed between the half-wings of the stabilizer.

Such design of the stabilizer ensures its rigid construction and, primarily, prevents the vibrational instability of the craft.

In this case, in order to increase the static stability of the craft and to displace its aerodynamic center more forward location, which is favorable for the craft stability, and also to provide an easier access to the engine, the chord of the additional element of the stabilizer is shorter than the half-wing chord at the interface of the additional element of the stabilizer and each of its half-wings.

In case of an inboard engine fitted on the craft, it is preferred that the craft be equipped with a hydrodynamic rudder connected with the stabilizer.

This gives a significant improvement of the craft manoeuvrability over a wide range of velocities.

The invention is further illustrated by a detailed description of its embodiments with reference to the accompanying drawings.

BEST MODE TO CARRY OUT THE INVENTION

Figure 1:
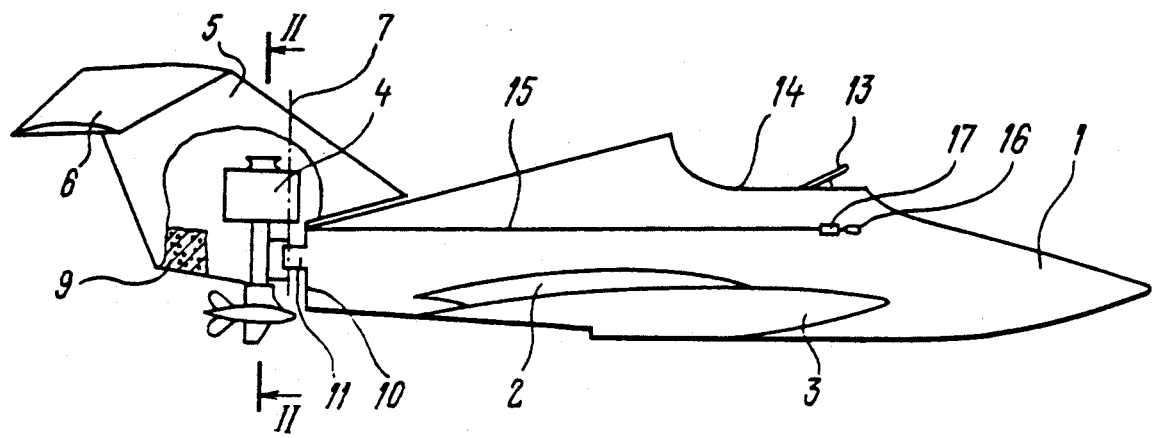
FIG. 1 shows a side view of a high-speed craft according to one embodiment of the invention.

The proposed high-speed craft comprises a hull 1 (FIG. 1) formed by an elongated streamlined body, lifting wings 2 provided with sponsons 3 and secured to the sides of the hull 1, and an engine 4, such as an outboard motor, and a tail fin assembly consisting of a vertical keel 5 and a stabilizer 6, both the engine and the fin assembly being mounted on the stern of the craft, the stabilizer consisting of two half-wings 6a and 6b (FIG. 2) arranged in an inverted-V configuration. The stabilizer 6 is rigidly attached to the vertical keel 5 which is rotatably mounted about a vertical, or near-vertical, axis 7 (FIG. 1) indicated symbolically by a dash-dot line. The vertical keel 5 has a cavity 8 provided in its bottom section and housing the outboard engine 4. The thickness of the keel 5 is 15 to 17% of its chord length, making it possible to cowl the engine 4 and to provide the required airfoil surface of the keel. To ensure stability of the craft at anchorage or in slow motion (in hull-borne conditions) and to minimize the after draught, the bottom section of the vertical keel 5 also encloses a buoyancy module 9 composed, say, of foam.

The outboard engine 4 is secured to a transom 10 of the hull 1 by means of an attachment fitting 11 and is connected with the vertical keel 5 by an easily detachable joint 12 (FIG. 2), such as bolts, so that the keel hinge axis 7 (FIG. 1) is at the same time an axis of rotation of the engine 4. The axis of rotation of the engine, however, may fail to coincide with the hinge axis of the vertical keel 5, necessitating the provision of an additional device for the keel and engine rotations to be locked into step. Making both the keel 5 and the outboard engine 4 rotatable about the same axis results in a simpler construction of the craft.

The craft further comprises the steering gear including a steering wheel 13 located in a cockpit 14 and tiller ropes 15 for connection of the steering wheel 13 with the outboard engine 4 and the vertical keel 5 through ports 16 in the sides of the hull 1. The tiller ropes 15 rest on supports 17.

The inverted-V angle of the stabilizer 6 lies within a sufficiently wide range, namely, from 2° to 25°, the preferable range being 10°–20°. Its magnitude depends on the specific aerodynamic characteristics of the high-speed craft, in particular, the area ratio of the lifting wings 2 and the stabilizer 6, the center-of-gravity location of the craft, the V-angle of the wings 2, etc.

Figure 2:
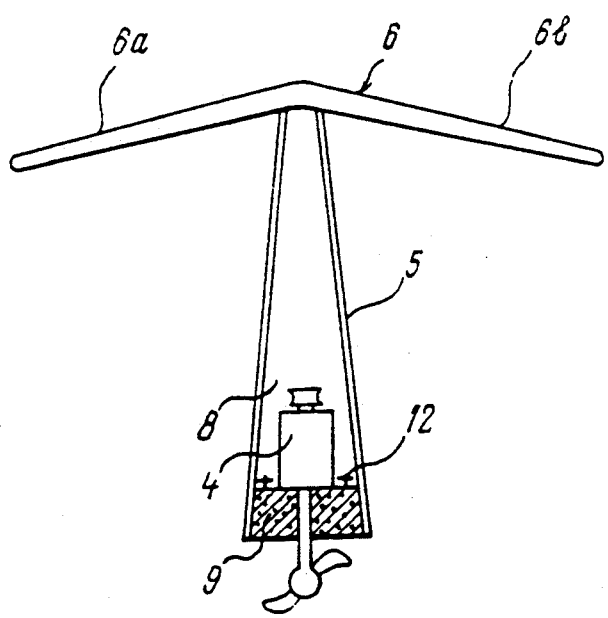
FIG. 2 is a sectional view taken along the line II—II of FIG. 1.

In the embodiment of FIGS. 1 and 2, the stabilizer 6 is swept in plan view, i.e. the tips of its half-wings 6a and 6b are shifted sternwards relative to the points of their attachment to the vertical keel 5. However, this is not the only embodiment of the invention, and other arrangements of the stabilizer half-wings are possible, such as that with the zero sweep. The wing sweep improves the operating conditions of the stabilizer and provides a greater arm length, resulting in a better stability of the craft. Neither does the vertical keel 5 always need to have the cavity 8 within. In case the hull 1 is sufficiently developed at the stern and its vertical dimension is comparable to that of the engine, the latter may be located below the vertical keel.

Figure 3:
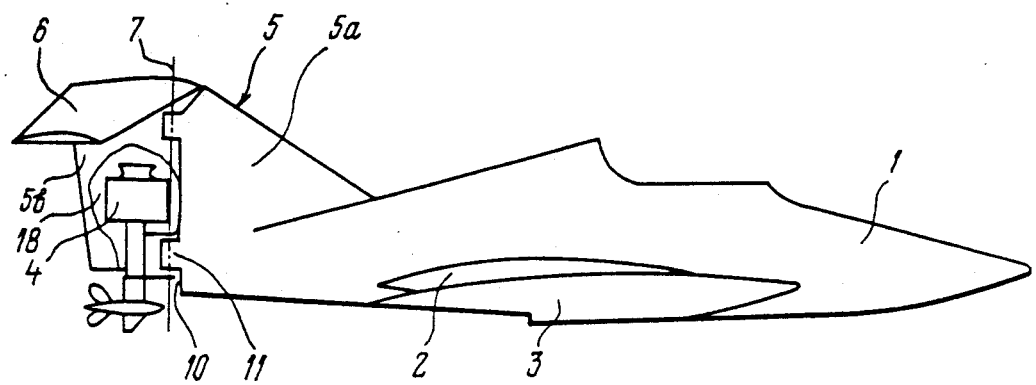
FIG. 3 is a side view of a high-speed craft, according to another embodiment of the invention.
Figure 4:
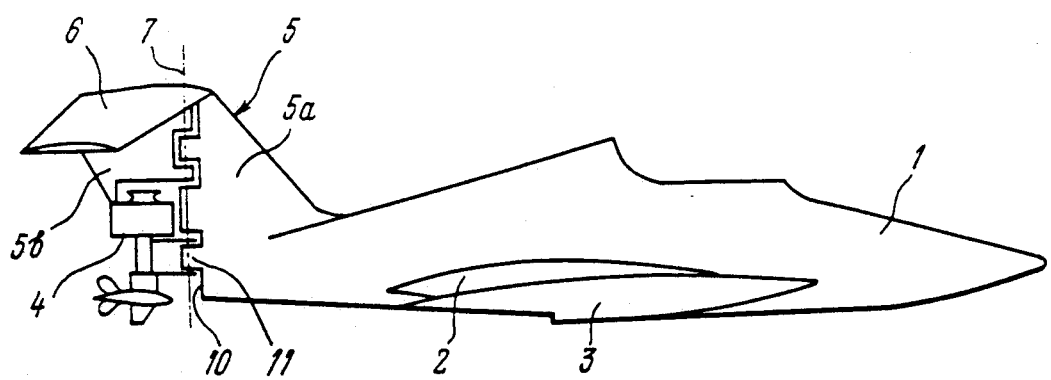
FIG. 4 is a side view of a high-speed craft, according to still another embodiment of the invention.

FIG. 3 shows another embodiment of the proposed craft differing from the above by the vertical keel 5 consisting of two parts: a stationary section 5a and a rotary section 5b rotatable about the axis 7, the stabilizer 6 being rigidly attached to the rotary section 5b of the vertical keel. Making only part of the keel 5 rotary is justified in case of a higher velocity of the craft, when the rotation of even one part of the vertical keel ensures the manoeuvrability required. Similarly to the design shown in FIGS. 1 and 2, the rotary section 5b of the rotary keel 5 is made hollow at bottom, and a cavity 16 receives the outboard engine 4, resulting in a substantially minimized aerodynamic drag of the craft, but making it somewhat more difficult to access the engine. In fact, if the ease of maintenance is one of the critical points in the design, the engine 4 may be disposed below the rotary section 5b of the keel (FIG. 4) which is manufactured essentially without an inner cavity. Such arrangement of the outboard engine 4 is preferred when the hull 1 is sufficiently high at the stern, fully or partially protecting the engine from the incident flow.

Figure 5:
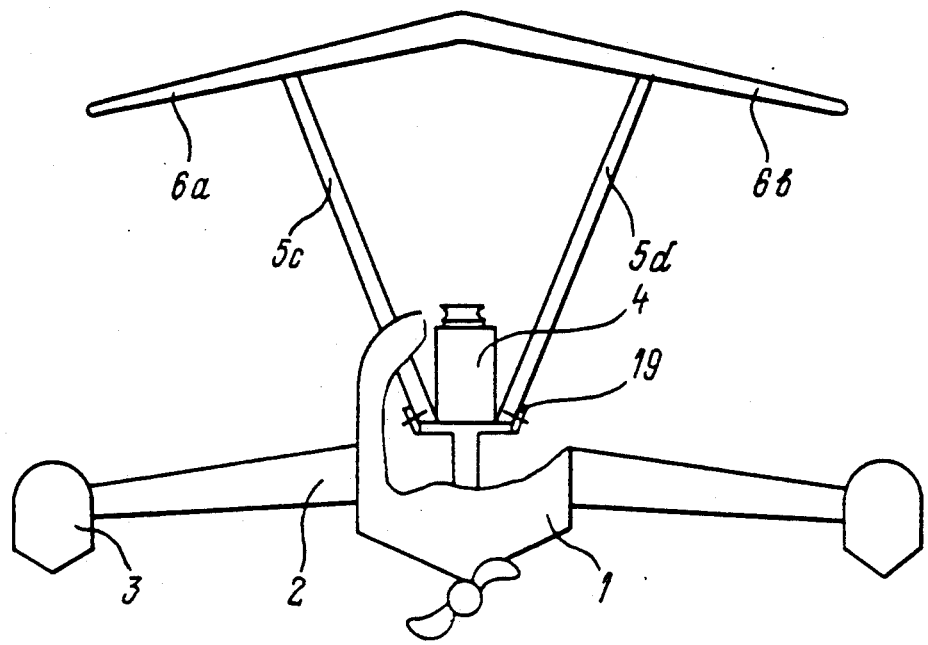
FIG. 5 is a front view of a high-speed craft, according to still another embodiment of the invention, partly cutaway.

FIG. 5 shows still another embodiment of the proposed craft, in which the vertical keel consists of two elements 5c and 5d arranged in symmetry about the center line of the craft and secured to the sides of the outboard engine 4 by easily detachable joints 19. Here the half-wing 6a of the stabilizer is attached to the element 5c, and the half-wing 6b, to the element 5d. The attachment of the elements 5c and 5d to the sides of the engine 4 provides an easy access thereto, though somewhat impairing the aerodynamic drag of the craft. In addition, the design of FIG. 5 slightly reduces the size of the tail fin assembly, facilitating the control. The elements 5c and 5d form an angle with the center line of the craft, so that the angle formed by each of these elements 5c and 5d and the respective half-wings 6a and 6b of the stabilizer is close to right angles (90°). The positioning of the elements 5c and 5d of the keel at an angle to the center line of the craft, in the first place, improves aerodynamic operating conditions of the vertical keel, leading to an undisturbed flow around it, and secondly, it simplifies the process of manufacturing the tail assembly, resulting in a strong and rigid stabilizer. The tilt angle of the keel elements 5c and 5d to the center line of the craft is generally within 30°. When the tilt angle exceeds this value, the aerodynamic effect of the vertical keel drops.

Figure 6:
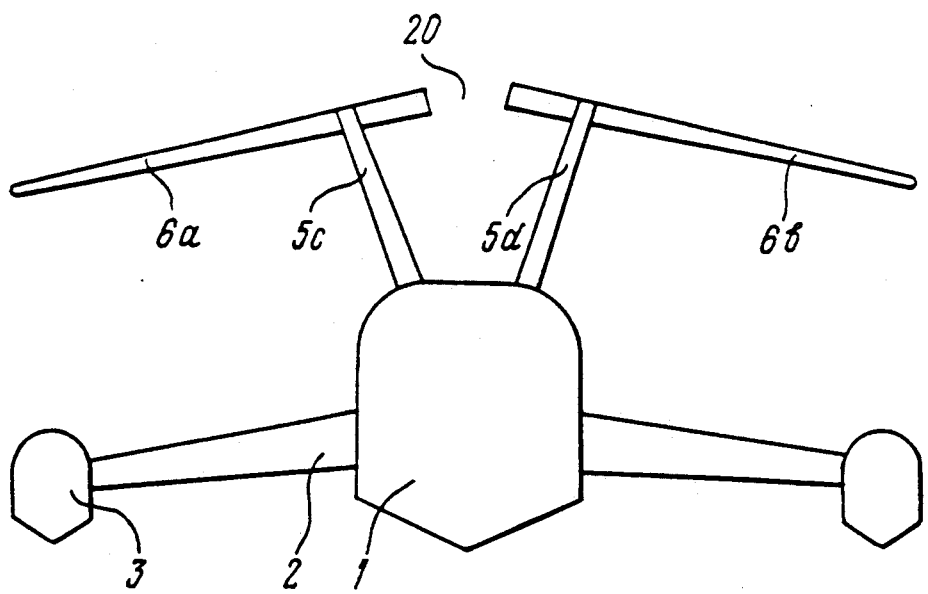
FIG. 6 is a front view of a high-speed craft, according to yet another embodiment of the invention.

To facilitate the maintenance of the outboard engine 4, particularly with small vertical dimensions of the keel elements 5c and 5d, the portions of the half-wings 6a and 6b disposed between the keel elements 5c and 5d in the vicinity of the center line of the craft are made of a transparent material such as plexiglas. Another means of easing the access to the outboard engine is a longitudinal slot 20 provided in the stabilizer 6 (FIG. 6).

The vertical keel elements 5c and 5d may also be attached to a specially provided rotary member rather than to the outboard engine. This construction, however, is much more complicated than those represented in FIGS. 5 and 6, making its use only justified with the inboard engine.

Figure 7:
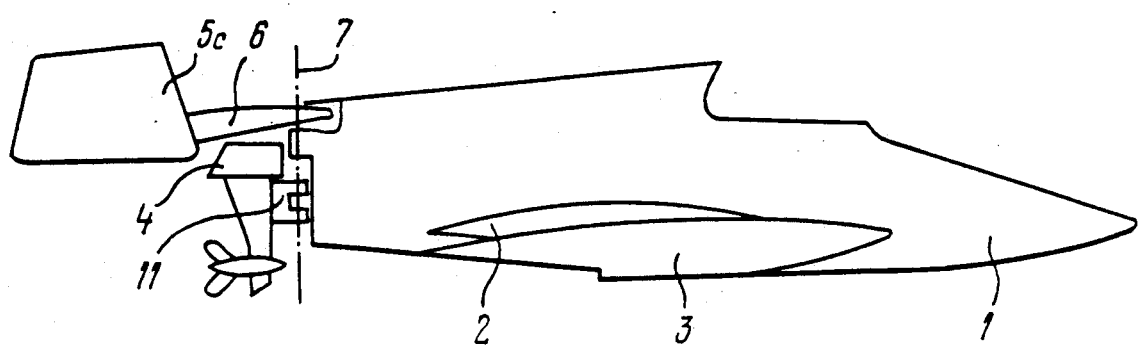
FIG. 7 is a side view of a high-speed craft, according to yet another embodiment of the invention.
Figure 8:
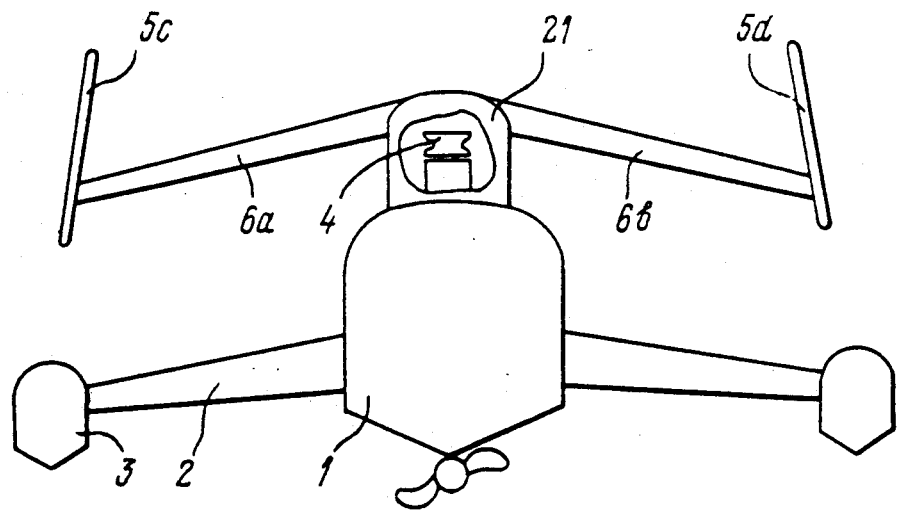
FIG. 8 shows a front view of a high-speed craft, according to yet another embodiment of the invention.

Provided the hull 1 of the craft is sufficiently developed and its vertical dimension is comparable to that of the above-water part of the outboard engine 4, and the aerodynamic configuration of the craft is such that a small wash occurs in the stern flow, the tail fin assembly of the craft is preferably realized in accordance with FIGS. 7 and 8. As shown in FIG. 7, the stabilizer 6 is mounted directly on the hull and is adapted to be rotatable about the vertical axis 7. On the other hand, if the outboard engine 4 is provided with an aerodynamic fairing 21 (FIG. 8), the stabilizer 6 is mounted on the fairing 21. In both cases, the elements 5c and 5d of the vertical keel are secured to the tips of the half-wings 6a and 6b, respectively, of the stabilizer.

Figure 9:
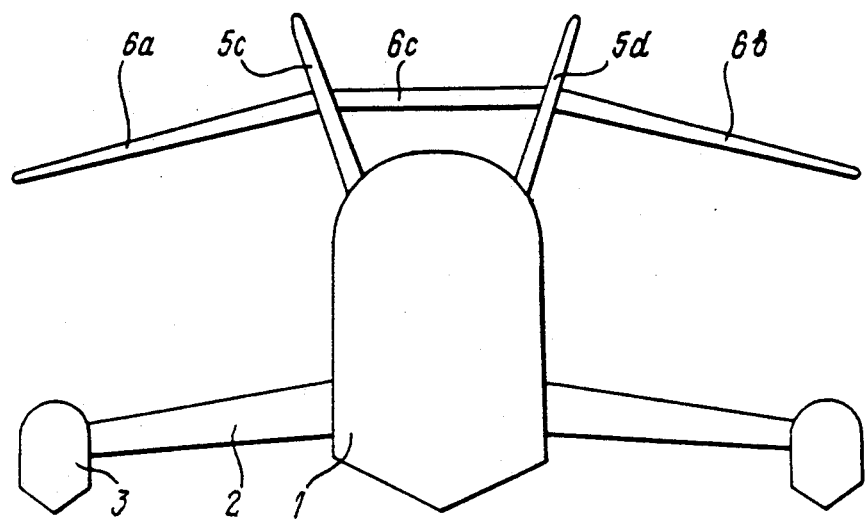
FIG. 9 is a front view of a high-speed craft, according to a further embodiment of the invention.
Figure 10:
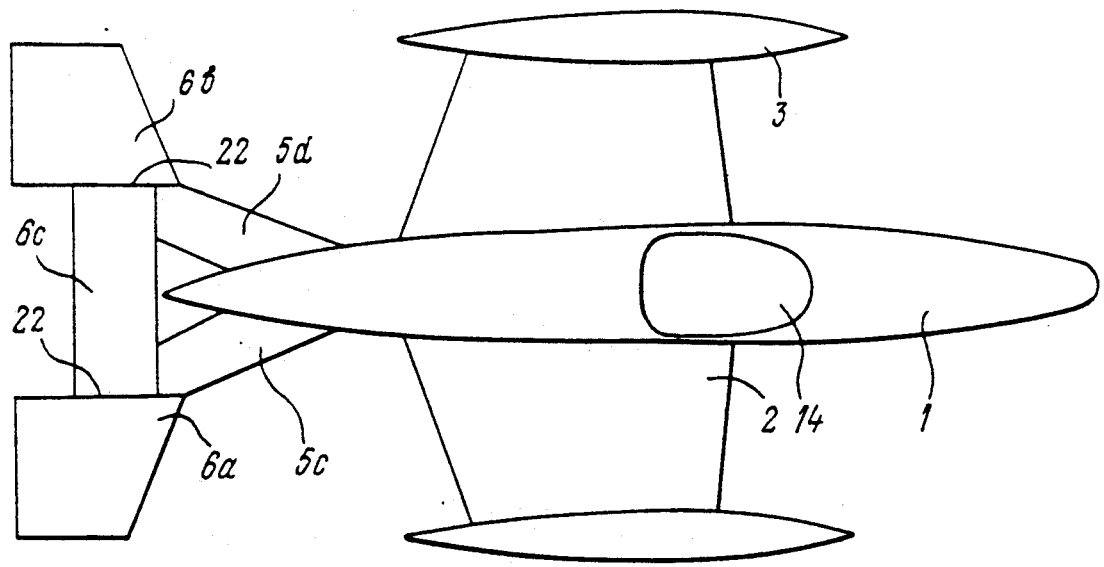
FIG. 10 is a plan view of the craft shown in FIG. 9.

According to FIG. 9, the stabilizer further comprises an additional member 6c interposed between the half-wings 6a and 6b. Such design of the stabilizer contributes to prevention of vibrational instability of the craft. Despite the fact that the stabilizer with the additional member, according to FIG. 9, is attached to the vertical keel consisting of the two elements 5c and 5d, it is evident that such stabilizer may be mounted on a one-piece keel located at the centre line of the craft, on the craft hull, or on the fairing of the outboard engine, i.e. in the designs illustrated in FIGS. 1, 3, 4, 7 and 8. Now, if the keel is formed by two elements 5c and 5d (FIGS. 7, 8, 9), the chord of the additional member 6c of the stabilizer on a section 22 (FIG. 10) where it joins either of the half-wings 6a and 6b, is shorter than the chord of these half-wings. This enables the static stability of the craft to be improved, when necessary, and the engine to be more easily accessed. Moreover, this design of the additional member 6c of the stabilizer permits the aerodynamic center to be shifted, in height, towards the bow of the craft.

Figure 11:
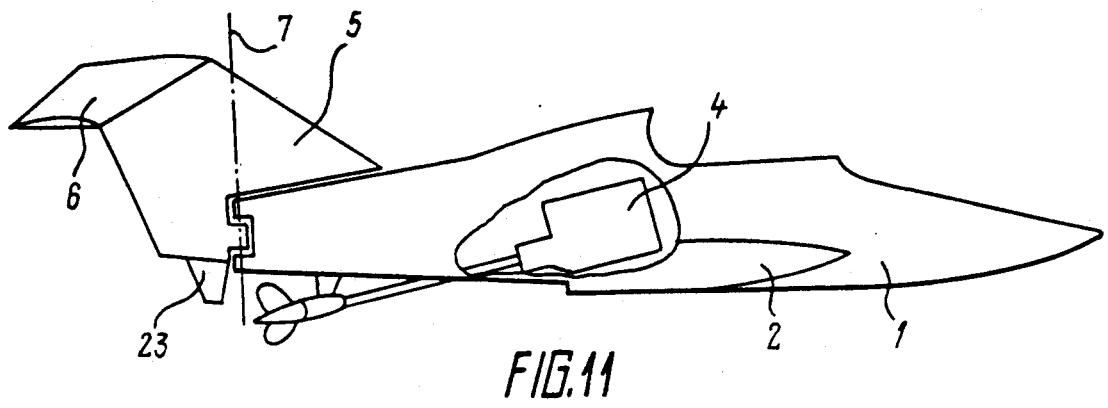
FIG. 11 is a side view of a high-speed craft, according to a further embodiment of the invention.

In accordance with FIG. 11, the engine 4 is mounted inside the hull 1. The craft has an additional hydrodynamic rudder 23 located in the stern portion of the bottom and connected with the steering gear. To simplify the construction of the craft, the hydrodynamic rudder stock coincides with the axis 7 of rotation of the vertical keel 5 and the stabilizer 6.

Figure 12:
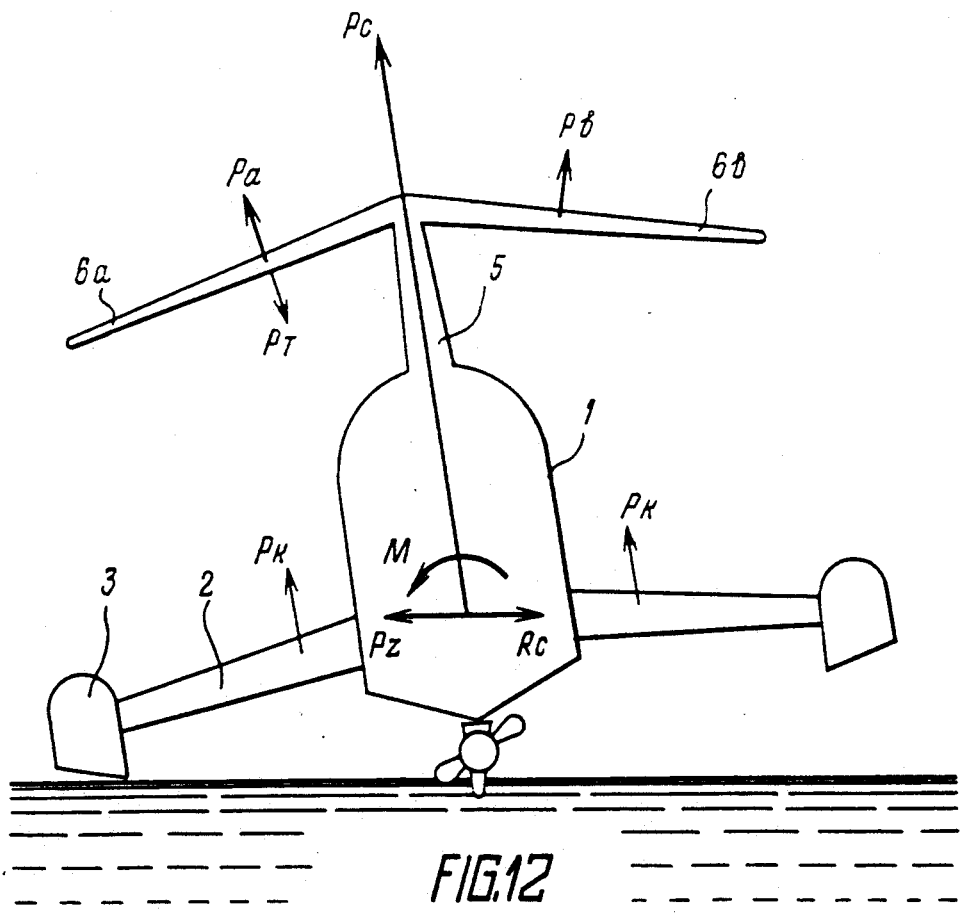
FIG. 12 is a graphic representation of forces acting on the proposed high-speed craft in turning.

When the craft is moving on water, it is acted upon by an aerodynamic lift $P_c$ (FIG. 12) which is the sum of the aerodynamic lift $P_k$ acting on the main wings 2, and the aerodynamic lifts $P_a$ and $P_b$ acting on the half-wings 6a and 6b, respectively. After the craft has been accelerated to a certain speed, such as 8-12 $Fr_v$, the aerodynamic lift $P_c$ reaches the weight of the craft, and the planing surfaces of the hull 1 and the sponsons 3 are brought out of engagement with the water. But the propeller of the engine 4 remains submerged, providing the required velocity. The outboard engine 4 cowled in the vertical keel 5 presents the minimum resistance to the motion, thus minimizing the induced drag of the entire craft. The turn of the steering wheel 13 (FIG. 1) causes the rotation of the vertical keel 5 or its rotary section 5b (FIGS. 3, 4) and of the stabilizer 6. Now, because the stabilizer 6 has an inverted-V configuration, a sinking force $P_T$ (FIG. 12) is generated on its half-wing which is on the inner side of the bend, such as the right-hand half-wing 6a when turning right, and the lift $P_b$ acting on the outer half-wing 6b is increased. Consequently, the tail assembly and hence, the entire craft is subjected to a moment M of high magnitude, which makes the craft heel to starboard. Now, the centrifugal forcee $R_c$ generated in turning the craft comes to be balanced out by the transverse component $P_z$ of the aerodynamic lift $P_c$, thus improving lateral stability when maneuvering, and allowing the turns of a sufficiently small radius to be performed by the helmsman without slowing down. This heeling moment M enables the inner surface of the right-hand sponson 3 to be brought into engagement with the water, developing a significant hydrodynamic force opposed to the lateral drift.

When the craft follows the straight course and is subjected to a strong cross wind, the known craft such as those described in the aforementioned references, deviate from the course or heel to leeward side. The proposed craft, owing to the inverted-V configuration of the stabilizer, especially in combination with the inverted-V configuration of the lifting wings, is free from this disadvantage, since a sinking force is produced on its windward wing 2 as well as on the windward half-wing of the stabilizer, such as the half-wing 6a, while an additional lift is developed on the leeward half-wing 6b. The heeling moment generated thereby and opposing to the wind tends to compensate for most of the heeling moment generated due to the forces appearing on the vertical keel and other elements of the craft.

In the craft designs shown in FIGS. 7 and 8, where the elements 5c and 5d of the vertical keel are mounted on the stabilizer 6 at an angle to the center line of the craft, the heeling force acts not only on the stabilizer half-wing on the inner side of the bend, such as the half-wing 6a, but also on the respective element 5c of the vertical keel. This further increases the heeling moment, consequently improving maneuverability of the craft. Moreover, the elements 5c and 5d of the vertical keel of the craft shown in FIGS. 7 and 8 function as aerodynamic end plates preventing the air flow from the pressure face of the stabilizer 6 to its suction face and enhancing the stabilizing effect.

The optimum value of the inward heel and consequently, the required lateral stability and manoeuvrability of the craft, are provided by an appropriate choise of areas of the elements of the tail fin assembly and the lifting wings, of their angles of incidence V-angle of the stabilizer, the center-of-gravity location of the craft, etc., when designing the craft.

In case of the inboard engine provided on the craft, the water rudder surface area is further taken account of.

INDUSTRIAL APPLICATION

The invention can be used in a wide range of sports, racing, pleasure boats, particularly in aerodynamic-relief craft (i.e. those having their hull weight, when moving at high velocities, balanced out not only by hydrostatic and hydrodynamic forces, but also by aerodynamic forces) and in ground-effect craft. The aerodynamic-relief craft may include race planing boats and scooters of the classes such as R1, R2, OA, OB, OC, OD, ON, etc.

We claim:

1. A high-speed craft comprising a hull (1), lifting wings (2) with sponsons (3), an engine (4), a steering gear and a tail fin assembly including a vertical keel (5) and a stabilizer (6) comprising a pair of half-wings (6a, 6b), wherein the stabilizer (6) is connected to the steering gear rotatably mounted about a vertical axis (7), and the pair of half-wings is mounted in an inverted-V configuration.

2. A craft as claimed in claim 1, wherein the half-wings (6a, 6b) of the stabilizer (6) are swept wings.

3. A craft as claimed in claims 1 or 2 wherein the vertical keel (5) is rotatable about the vertical axis (7) and connected with the steering gear, wherein the stabilizer (6) is rigidly attached to the vertical keel (5).

4. A craft as claimed in claim 3, wherein the engine (4) is an outboard engine, and the vertical keel (5) has a cavity (8) provided in its bottom part, and the engine (4) is housed inside said cavity (8).

5. A craft as claimed in claim 3, wherein the vertical keel (5) includes a pair of elements (5c, 5d) arranged symmetrically about the center line of the craft to support the stabilizer.

6. A craft as claimed in claim 5, wherein the elements (5c, 5d) of the vertical keel (5) are mounted at an angle to the center line of the craft.

7. A craft as claimed in claim 6, wherein the engine (4) is an outboard engine wherein the elements (5c, 5d) of the vertical keel (5) are secured to the sides of the engine (4).

8. A craft as claimed in claim 6, wherein the elements (5c, 5d) of the vertical keel (5) are mounted on the hull and secured to the half-wings (6a, 6b) of the stabilizer (6).

9. A craft as claimed in claim 6, wherein the engine (4) is an outboard engine and is provided with an aerodynamic fairing (21), wherein the stabilizer (6) is mounted on the fairing (21), and the elements (5c, 5d) of the vertical keel (5) are secured to half-wings (6a, 6b) of the stabilizer (6).

10. A craft as claimed in claim 6, wherein the engine is an outboard engine, wherein a portion of the stabilizer (6) in the vicinity of the center line of the craft is made of a transparent material.

11. A craft as claimed in claim 6, wherein the stabilizer (6) comprises a longitudinal slot (20) disposed between the elements (5c, 5d) of the vertical keel (5).

12. A craft as claimed in claim 5, wherein the engine (4) is an outboard engine wherein the elements (5c, 5d) of the vertical keel (5) are secured to the sides of the engine (4).

13. A craft as claimed in claim 5, wherein the elements (5c, 5d) of the vertical keel (5) are mounted on the hull and secured to the half-wings (6a, 6b) of the stabilizer (6).

14. A craft as claimed in claim 5, wherein the engine (4) is an outboard engine and is provided with an aerodynamic fairing (21), wherein the stabilizer (6) is mounted on the fairing (21), and the elements (5c, 5d) of the vertical keel (5) are secured to half-wings (6a, 6b) of the stabilizer (6).

15. A craft as claimed in claim 5, wherein the engine is an outboard engine, wherein a portion of the stabilizer (6) in the vicinity of the center line of the craft is made of a transparent material.

16. A craft as claimed in claim 5, wherein the stabilizer (6) comprises a longitudinal slot (20) disposed between the elements (5c, 5d) of the vertical keel (5).

17. A craft as claimed in claims 1 or 2, wherein the stabilizer (6) includes an additional member (6c) interposed between the half-wings (6a, 6b).

18. A craft as claimed in claim 17, wherein the additional member (6c) of the stabilizer (6) joins each of the half-wings (6a, 6b) and the chord of the additional member (6c) is shorter than the chords of the half-wings (6a, 6b).

19. A craft as claimed in claims 1 or 2, wherein the engine (4) is stationarily mounted, and the craft further includes a hydrodynamic rudder (23) connected with the stabilizer (6).

20. A craft as claimed in claims 1 or 2, wherein a section (5b) of the vertical keel (5) is connected with the steering gear and is rotatable about the vertical axis (7); the stabilizer (6) being rigidly attached to the rotatable section (5b) of the vertical keel (5).

21. A craft as claimed in claim 20, wherein the engine (4) is an outboard engine, and the rotary section (5b) of the vertical keel (5) has a cavity (18), provided in its bottom part, and the engine (4) is housed within said cavity (18).

22. A craft as claimed in claim 20, wherein the engine (4) is an outboard engine, and the rotatable section (5b) of the vertical keel (5) is located above the engine (4).

* * * * *